(12) United States Patent
Yao et al.

(10) Patent No.: US 12,069,746 B2
(45) Date of Patent: Aug. 20, 2024

(54) METHODS AND APPARATUS FOR SELF-DETECTION OF COLLISIONS BY A USER EQUIPMENT

(71) Applicant: Apple Inc., Cupertino, CA (US)

(72) Inventors: Chunhai Yao, Beijing (CN); Chunxuan Ye, San Diego, CA (US); Dawei Zhang, Cupertino, CA (US); Haijing Hu, Cupertino, CA (US); Haitong Sun, Cupertino, CA (US); Hong He, Cupertino, CA (US); Jia Tang, Cupertino, CA (US); Oghenekome Oteri, San Diego, CA (US); Sigen Ye, Cupertino, CA (US); Wei Zeng, Cupertino, CA (US); Weidong Yang, San Diego, CA (US); Yushu Zhang, Beijing (CN); Zhibin Wu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,752

(22) PCT Filed: Aug. 6, 2020

(86) PCT No.: PCT/CN2020/107449
§ 371 (c)(1),
(2) Date: Sep. 22, 2021

(87) PCT Pub. No.: WO2022/027452
PCT Pub. Date: Feb. 10, 2022

(65) Prior Publication Data
US 2023/0156824 A1 May 18, 2023

(51) Int. Cl.
*H04W 56/00* (2009.01)
*H04L 1/1812* (2023.01)
*H04W 74/0833* (2024.01)

(52) U.S. Cl.
CPC ....... *H04W 74/0858* (2013.01); *H04L 1/1812* (2013.01)

(58) Field of Classification Search
CPC .................. H04W 74/0858; H04L 1/1812
(Continued)

(56) References Cited

U.S. PATENT DOCUMENTS

| 11,387,963 B2* | 7/2022 | Ryu | H04W 72/20 |
| 2018/0167976 A1* | 6/2018 | Wentink | H04W 74/0816 |

(Continued)

FOREIGN PATENT DOCUMENTS

| CN | 110547036 A | 12/2019 |
| CN | 110999335 A | 4/2020 |
| CN | 111107618 A | 5/2020 |

OTHER PUBLICATIONS

International Search Report Dated Apr. 29, 2021 for International Application PCT/CN2020/107449.
(Continued)

*Primary Examiner* — Sai Ming Chan
(74) *Attorney, Agent, or Firm* — Eschweiler & Potashnik, LLC

(57) ABSTRACT

An evaluating user equipment (UE) includes memory and one or more processors communicatively coupled to the memory. The one or more processor are configured to schedule periodic resources with one or more configured feedback-based collision detection parameters, and perform a periodic transmission to one or more receiving UEs. The one or more processors are also configured to collect negative acknowledgement (NACK) statistics for the periodic transmission according to the configured feedback-based collision detection parameters, and selectively perform cor-
(Continued)

rective action based on the collected NACK statistics and at least one of the configured feedback-based collision detection parameters.

20 Claims, 10 Drawing Sheets

(58) Field of Classification Search
USPC .......................................................... 370/328
See application file for complete search history.

(56) References Cited

U.S. PATENT DOCUMENTS

| 2019/0132104 | A1  | 5/2019 | Lee et al. | |
|---|---|---|---|---|
| 2021/0136781 | A1* | 5/2021 | Hosseini | H04W 72/23 |
| 2022/0150730 | A1* | 5/2022 | Freda | H04L 1/188 |

OTHER PUBLICATIONS

"CMCC Discussion on Sidelink Resource Allocation Mechanism"; 3GPP TSG RAN WG1 #97; R1-1906515; May 2, 2019.
International Written Opinion Dated Apr. 29, 2021 for International Application PCT/CN2020/107449.
International Preliminary Report on Patentability dated Feb. 7, 2023 in connection with Application Serial No. PCT/CN2020/107449.

* cited by examiner

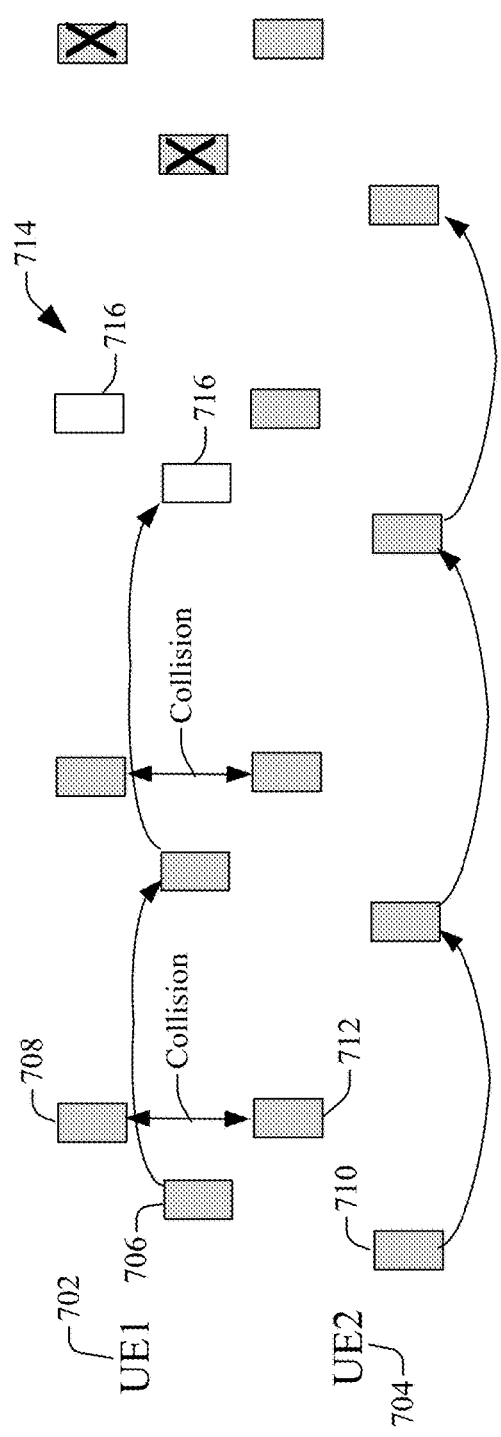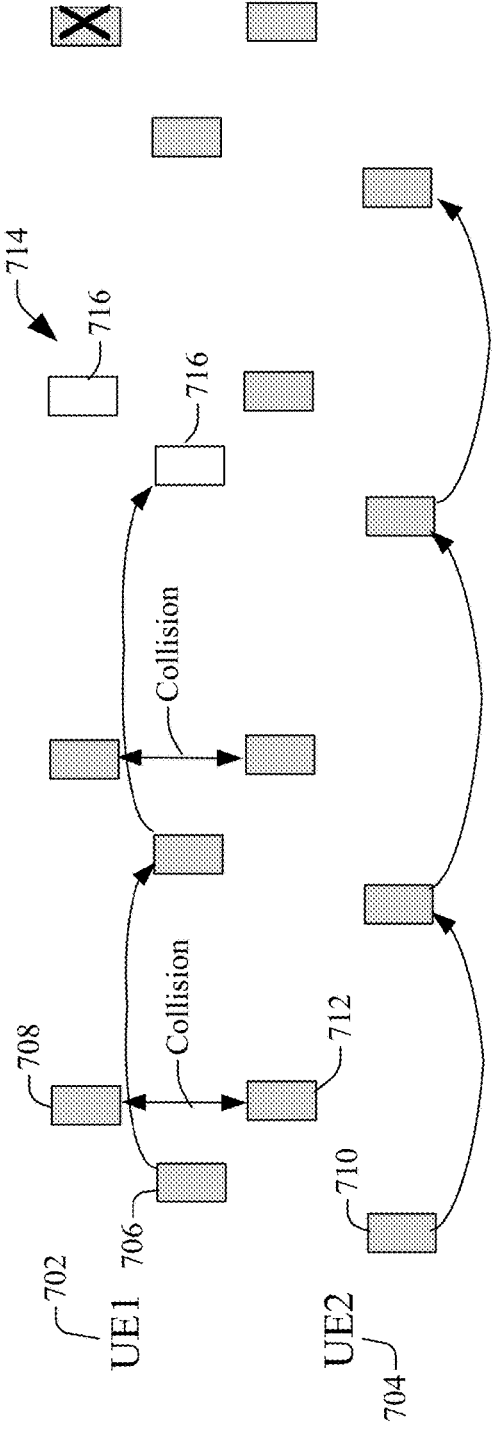

METHODS AND APPARATUS FOR SELF-DETECTION OF COLLISIONS BY A USER EQUIPMENT

REFERENCE TO RELATED APPLICATIONS

This application is a National Phase entry application of International Patent Application No. PCT/CN2020/107449 filed Aug. 6, 2020, entitled "METHODS AND APPARATUS FOR SELF-DETECTION OF COLLISIONS BY A USER EQUIPMENT", the contents of which are herein incorporated by reference in their entirety."

BACKGROUND

The 3GPP standard body released the C-V2X standard to support V2X (i.e., vehicle-to-everything) communication. NR V2X includes two modes of operation, identified as Mode 1 and Mode 2. Mode 1 deals with gNB (e.g., base station) scheduling, while Mode 2 deals with autonomous selection. M ode 2 does not require the support of cellular infrastructure, and vehicles can autonomously select their sub-channels for their V2V transmissions.

BRIEF DESCRIPTION OF THE DRAWINGS

Some examples of circuits, apparatuses and/or methods will be described in the following by way of example only. In this context, reference will be made to the accompanying figures.

FIGS. 7A-7B are diagrams illustrating discontinuous periodic transmission schemes in instances where multiple, non-contiguous resource blocks are scheduled in each transmission period according to various aspects.

DETAILED DESCRIPTION

Figure 1:
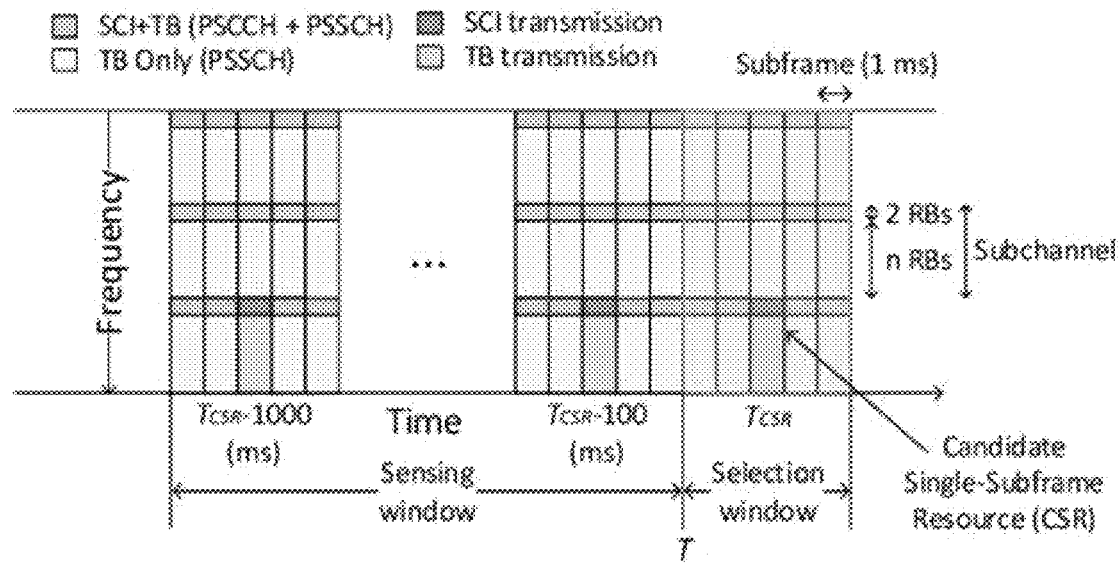
FIG. 1 is a time-frequency diagram illustrating the two step sensing and selection for V2X autonomous selection.

The present disclosure is described with reference to the attached figures. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

As highlighted above, Mode 1 in NR V2X involves vehicle direct communication with one another, however, those communications are managed by a cellular infrastructure that selects the sub-channels and time slots or radio resources for each V2V transmission. In contrast, Mode 2 in NR V2X does not require the support of the cellular infrastructure, and vehicles autonomously select the sub-channels and time slots or radio resources for their V2V transmissions. In this framework, the 3GPP standard defines a distributed semi-persistent scheduling scheme that all the vehicles must implement.

C-V2X supports 10 MHz and 20 MHz channels. The channel is divided temporally into 1 ms sub-frames and into resource blocks (RBs) of 180 KHz each. The standard defines a sub-channel as a group of RBs in the same sub-frame. The sub-channels are used to transmit data and control information. Such data is transmitted in transport blocks (TBs) over physical sidelink shared channels (PSSCH), and the control information is transmitted in sidelink control information (SCI) messages over physical sidelink control channels (PSCCH). A TB contains a full packet and can occupy one or several sub-channels. Each TB has an SCI associated therewith, and both are transmitted in the same sub-frame. The SCI occupies a configurable number of RBs and configurable number of OFDM symbols and includes information such as the modulation and coding scheme (MCS) used to transmit the TB, and the RBs that the TB occupies, and the resource reservation period (RRP) for the semi-persistent scheduling scheme. The resource reservation period refers to the periodicity used by vehicles to transmit their packet, and the period or interval is specified in multiples of 100 ms (e.g., 100 ms, 200 ms, . . . 1000 ms). The information on the SCI is valuable, so the SCI must be correctly received to receive and decode the TB.

In Mode 2, vehicles autonomously select their sub-channels and time slots using a sensing based semi-persistent scheduling (SPS) scheme, wherein vehicles reserve the selected sub-channels and time slots for a number of consecutive packet transmissions, dictated by a reselection counter value. After such number of transmissions, new resources or sub-channels must be selected and reserved. The process by which a vehicle selects and reserves resources is a multi-step process, which can be appreciated with reference to FIG. 1. Note that FIG. 1 technically illustrates an LTE two-step procedure, but for purposes of understanding the substance, it is sufficient for explanatory purposes. At a high level, in a sensing step (or sensing window shown in FIG. 1) the UE listens to the channel, i.e., listening for channel information (SCI of other vehicles) in order to see what resources are already reserved. In a selection step candidate resources are identified and subsequently selected or reserved.

More particularly, whenever a new resource is to be selected, resources can be reserved by the vehicle in a time period called the selection window, as shown in FIG. 1. Within this time period the vehicle identifies the candidate single sub-frame resources (CSRs) to be reserved. A CSR is a group of adjacent sub-channels within the same sub-frame where the packet or SCI and TB resides. If "T" is the beginning time of a time window in which the new resource selection must be made (i.e., the selection window), the vehicle senses all packets in a preceding sensing window that includes 1000 subframes before T. The vehicle creates a list that includes all the CSRs in the sensing window (i.e., candidate CSRs), except for CSRs that satisfy two criteria: (1) the resource is indicated in a received SCI from another vehicle (indicating that another vehicle will utilize that resource at the same time, and (2) a measured average reference signal received power (RSRP) over the RBs used to transmit the TB associated with the SCI of the other vehicle is greater than a RSRP threshold. If both conditions are met, the vehicle excludes that particular CSR as a candidate CSR. The vehicle then may perform a resource selection for a transmission from the identified candidate resources (CSRs) in the selection window.

As discussed above, in those instances when a periodic resource reservation is made, when the vehicle UE initiates transmission on the selected resources, it does not monitor the sidelink channels due to the half-duplex system constraint, and consequently if another vehicle UE selects the same periodic resources for its own sidelink transmissions, such dueling sideline transmissions could possibly continuously collide with each other. This undesired collision condition is illustrated in FIG. 2, wherein UE 1 and UE2 correspond to two different vehicles that are transmitting on the same selected time-frequency resources (i.e., the same sub-channel at the same time).

Figure 2:
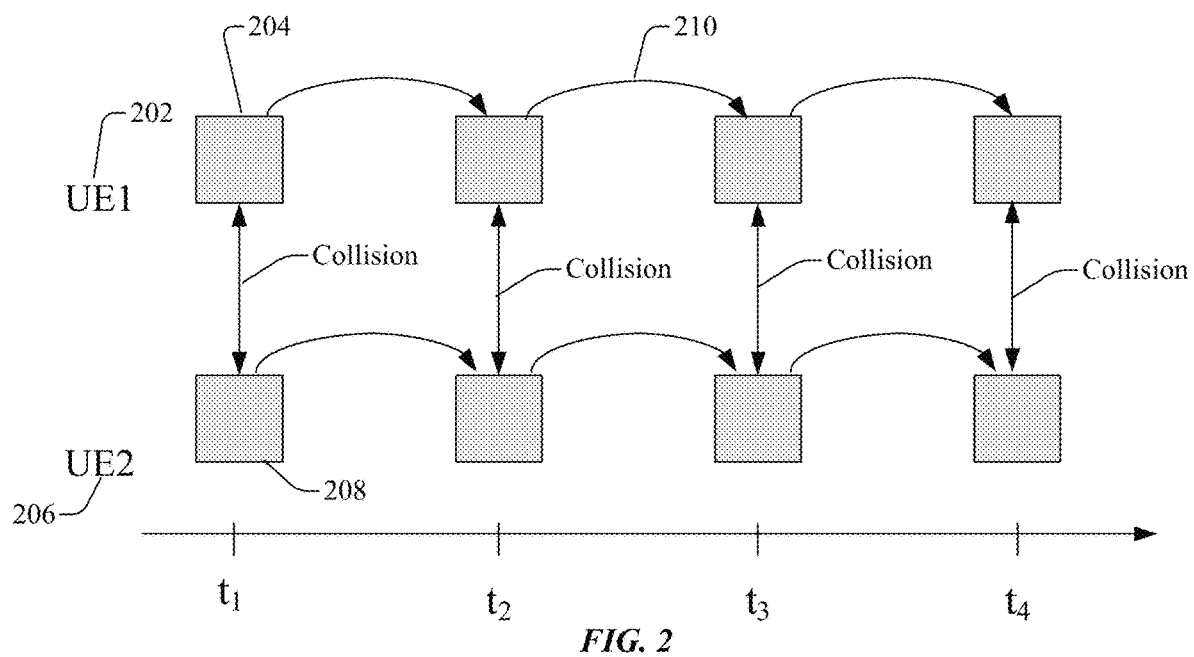
FIG. 2 is a diagram illustrating a potential collision problem in V2X autonomous selection for periodic transmission schemes.

As shown in FIG. 2, a first UE 202 (e.g., UE1 corresponding to a first vehicle) has a first periodic resource reservation 204 at a time $t_1$, while a second UE 206 (e.g., UE2 corresponding to a second vehicle) has a second periodic resource reservation 208 that occupies the same time-frequency resources as the first reservation 204. Further, in the example of FIG. 2, both resource reservations 204, 208 have the same periodicity 210 and thus not only is there a collision at time $t_1$, but the data collisions continue at times $t_2$, $t_3$, $t_4$. etc. In light of the appreciated issues highlighted above, the present disclosure provides circuitry, a methodology and a non-transitory computer readable medium for discontinuous periodic transmission that addresses this issue.

In one aspect, the UE (referred to as the evaluating UE) intentionally does not transmit in one of the scheduled, reserved time periods (which may be referred to as a scheduled discontinuous time period), and instead performs a channel monitoring on the periodically reserved resources. If during the monitoring function, an SCI of another UE (referred to as a competing UE) is detected, some form of corrective action is selectively performed, wherein the form of corrective action is based on the resource reservation period (RPP) and in some instances on a data priority of the competing UE. For example, in one aspect in which data priority is not a factor or a consideration, the form of corrective action based on the RRP may depend upon whether RRPs of the evaluating UE and the competing UE are: (1) identical, (2) the competing UE's RRP is an integer multiple of the evaluating UE's RRP, or (3) the evaluating UE's RRP is an integer multiple of the competing UE's RRP. FIG. 3A-5 illustrate the three conditions highlighted above to help understand how the corrective action may differ based on the relative RRPs.

Figure 3A:
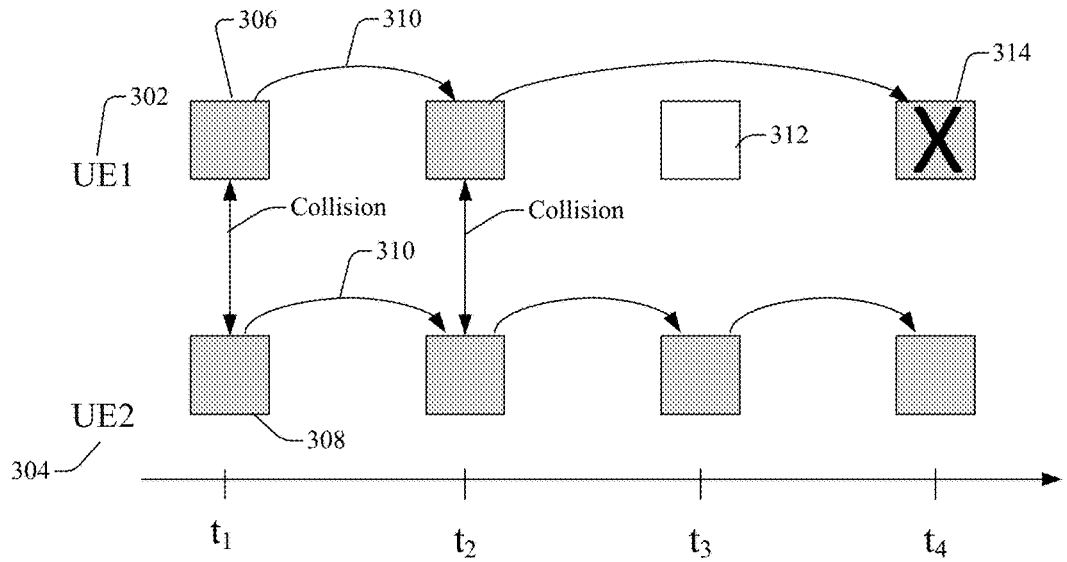
FIG. 3A is diagram illustrating a discontinuous periodic transmission scheme to address the collision problem with a periodic transmission scheme with a V2X autonomous selection process according to an aspect.

FIG. 3A illustrates condition (1) above, wherein the evaluating UE 302 (e.g., UE1) and the competing UE 304 (e.g., UE2) have reserved the same time-frequency resources (e.g., resources 306 and 308 are the same). In addition, in this example, the reserved resources 306, 308 have the same periodicity 310, meaning that the RRPs of the resources 306, 308 are identical. Therefore absent any corrective action, data collisions will occur and not be detected by either UE 302, 304. In this example, UE 302 is the evaluating UE and elects to not transmit at a time period (i.e., $t_3$), and instead performs a monitoring operation 312 of the channel at that time period. By not transmitting at the otherwise scheduled time period (e.g., a scheduled discontinuous time period), the evaluating UE 302 is performing a discontinuous periodic transmission. If, at the monitoring time period $t_3$ an SCI of a competing UE is detected and decoded that indicates the same time-frequency resource having an identical RRP, the evaluating UE 302 stops transmitting on the colliding resources, and instead initiates a re-selection procedure, wherein the UE 302 performs the two-part sensing and selection procedure discussed supra with respect to FIG. 1 to schedule other resources. This is seen in FIG. 3A at 314, wherein the transmission at time $t_4$ is not performed and instead a re-selection procedure is initiated.

The above example discussion ignores the issue of data priority. That is, in the example of FIG. 3A, the evaluating UE 302 discontinues transmission at $t_4$ independently of whether or not the priority of the data transmission of the evaluating UE 302 is higher or lower than that of the competing UE 304. In one aspect, the evaluating UE 302 performs the monitoring operation 312 at $t_3$ and decodes an SCI indicating a colliding transmission with a competing UE having an identical RRP. The evaluating UE 302 then further evaluates the data transmission priority of the competing UE 304, for example, by evaluating the decoded SCI of the competing UE 304, and if the data transmission priority of the evaluating UE 302 is higher than the priority of the competing UE 304 data transmission, then the evaluating UE 302 does not discontinue transmission. In this case, despite the collision, because of the higher data priority, the evaluating UE 302 does not stop transmitting, but instead continues to transmit.

In one aspect, if each of the UEs are operating in accordance with the present disclosure, the competing UE 304 is sometimes operating as an evaluating UE and in such instance would detect the collision and higher data priority of the other competing UE, and in response would discontinue transmission and initiate a re-selection procedure.

Figure 3B:
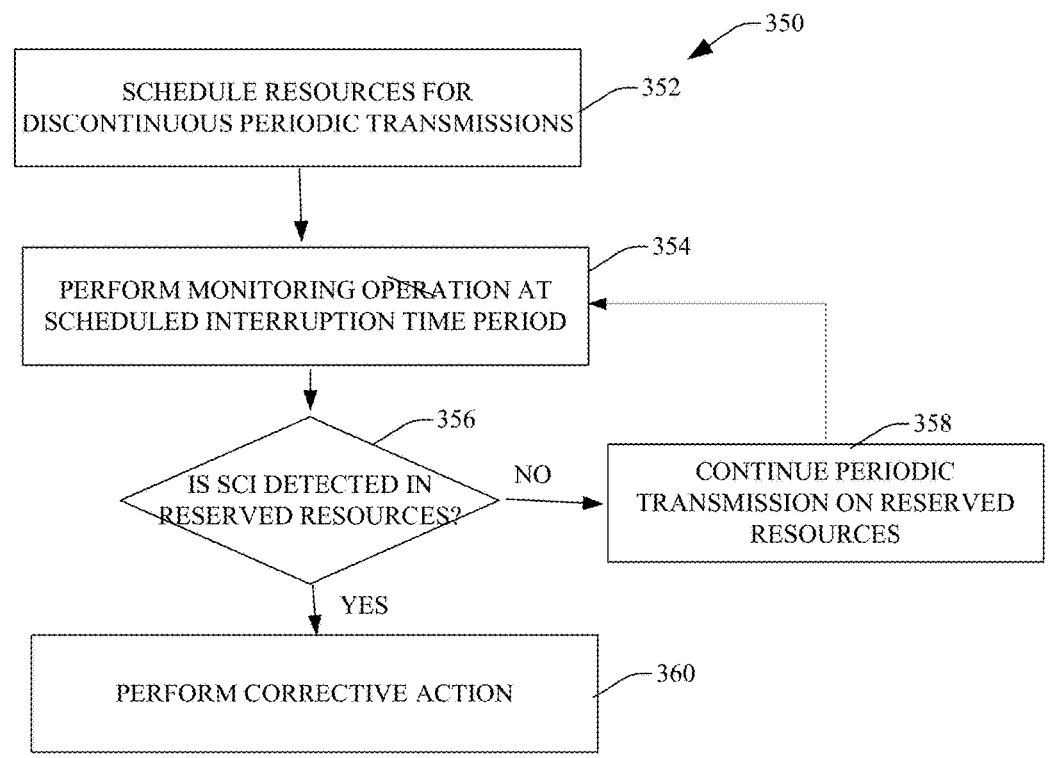
FIG. 3B is a flow diagram illustrating the discontinuous periodic transmission scheme of FIG. 3A according to an aspect.

Therefore as highlighted above in conjunction with FIG. 3A, the disclosure contemplates a UE, or one or more processors in a UE that, upon executing instructions are configured to perform discontinuous periodic communication 350 with another UE, as set forth in FIG. 3B. The process 350 may be the functions of an apparatus comprising the functions of one or more processors in an evaluating UE, may be a method, and/or may be non-transitory computer readable media containing instructions that when executed by one or more processor result in the functions described herein. At 352, the one or more evaluating UE processors are configured to schedule resources for discontinuous periodic transmission. As highlighted above, such scheduling looks similar to that of UE1 302 that schedules a monitoring operation at a scheduled discontinuous time period (e.g., $t_3$ of FIG. 3A) that would otherwise be used for a data transmission. Such scheduling includes reservation of periodic time-frequency resources. Further details of such scheduling will be discussed infra. Such scheduling details are set forth in the SCI and may include the periodicity, data priority, as well as other parameters that characterize the discontinuous periodic communication.

Still referring to FIG. 3B, the one or more UE processors perform the monitoring operation according to one of various methods. In one option the monitoring operation is scheduled according to a random selection with a probability (A) that may be preconfigured or may be a function of other criteria, such as data priority. In another aspect the selection of the monitoring process timing may follow a predefined pattern, such that the nature of the discontinuous transmission itself has a periodicity. Further details of how and when such monitoring is executed will be discussed in further detail infra.

During the monitoring operation at 354, the one or more UE processors monitor the channel for the SCI of other transmitting UEs (i.e., competing UEs) at 356. If no other transmissions are detected, or if an SCI is detected, but upon decoding does not include reserved resources that would collide with the evaluating UE (NO at 356), the discontinuous periodic transmission is continued at 358 until the next scheduled monitoring event. If, however, an SCI of a competing UE is detected that does conflict with the reserved resources of the evaluating UE (YES at 356), the one or more UE processors (i.e., the evaluating UE) performs a corrective action at 360.

In one aspect, the corrective action taken at 360 comprises discontinuing the periodic transmission by the evaluating UE, and then initiating a re-selection process, where the UE does the two step sensing and selection procedure discussed above in conjunction with FIG. 1. In another aspect, the corrective action can be selective, wherein the discontinuation of data transmission is contingent upon the relative data priority levels or some other criteria. For example, upon decoding the SCI of the competing UE, if the scheduled resources conflict, but the relative data priorities of the evaluating UE and the competing UE meet some predetermined relationship, the evaluating UE will not discontinue transmission despite the detection of the collisions. For example, if the data priority of the evaluating UE is greater than that of the competing UE, the transmission may continue. Alternative, other criteria may be employed to make the corrective action at 360 selective.

Figure 4:
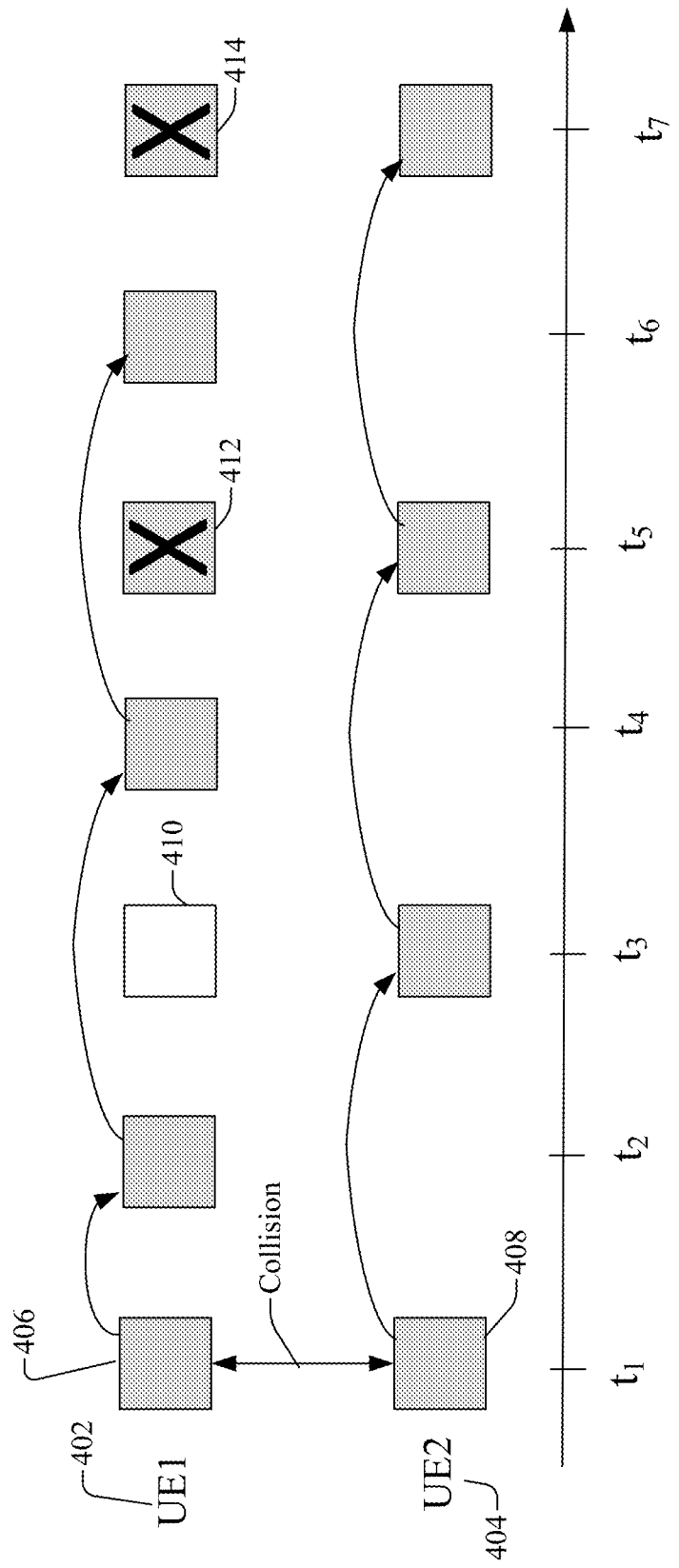
FIG. 4 is a diagram illustrating a unique collision condition with V2X autonomous selection when a competing UE has an resource reservation period (RRP) that is an integer multiple of an evaluating UE according to an aspect.

As discussed above, the type of corrective action taken by an evaluating UE may differ based on the RRP of the evaluating UE and the competing UE. Option (2) corresponds to the condition where the RRP of the competing UE is an integer multiple of the evaluating UE (e.g., if the period of the evaluating UE is 100 ms, the period of the competing UE is 100 ms X "N", wherein N is an integer), and is illustrated in FIG. 4. As shown in FIG. 4, a competing UE 404 performs periodic transmission that exhibits a period that is an integer multiple of the period transmission of the evaluating UE 402. In this example, the integer is 2, and thus the evaluating UE 402 transmits data twice as often as the competing UE 404. As can be seen in FIG. 4, in such a situation, a collision will not occur for every evaluating UE transmission, but will occur for every competing UE transmission. In this example, a collision occurs at $t_1$, but not at $t_2$. When the evaluating UE 402 discontinues transmission and instead performs a monitoring operation 410 at $t_3$, the evaluating UE 402 decodes the SCI of the competing UE 404 and sees that it has an RRP that is an integer multiple of the evaluating UE RRP (e.g., 100 ms compared to 200 ms). At this point, the evaluating UE may select a few different options for its corrective action. In one aspect the evaluating UE discontinues only those transmissions at colliding time periods (e.g., 412 and 414), while continuing to transmit at the other, non-conflicting time periods. In this case, the evaluating UE 402 does not initiate a re-selection procedure, but instead just skips transmitting on the colliding resources. Alternatively, the evaluating UE 402 may elect to initiate a re-selection procedure. In yet another alternative aspect, upon identifying the condition, the evaluating UE 402 may employ other criteria in deciding whether to skip colliding resource time periods 412, 414 or initiate re-selection. For example if the data transmission priority for the evaluating UE 402 is "high" (e.g., above a predetermined threshold), re-selection might be initiated. Alternatively re-selection could be initiated if the priority is "low" according to some predetermined criteria or threshold. Any other substantive criteria could be employed and is appreciated to be contemplated by the present disclosure.

Figure 5:
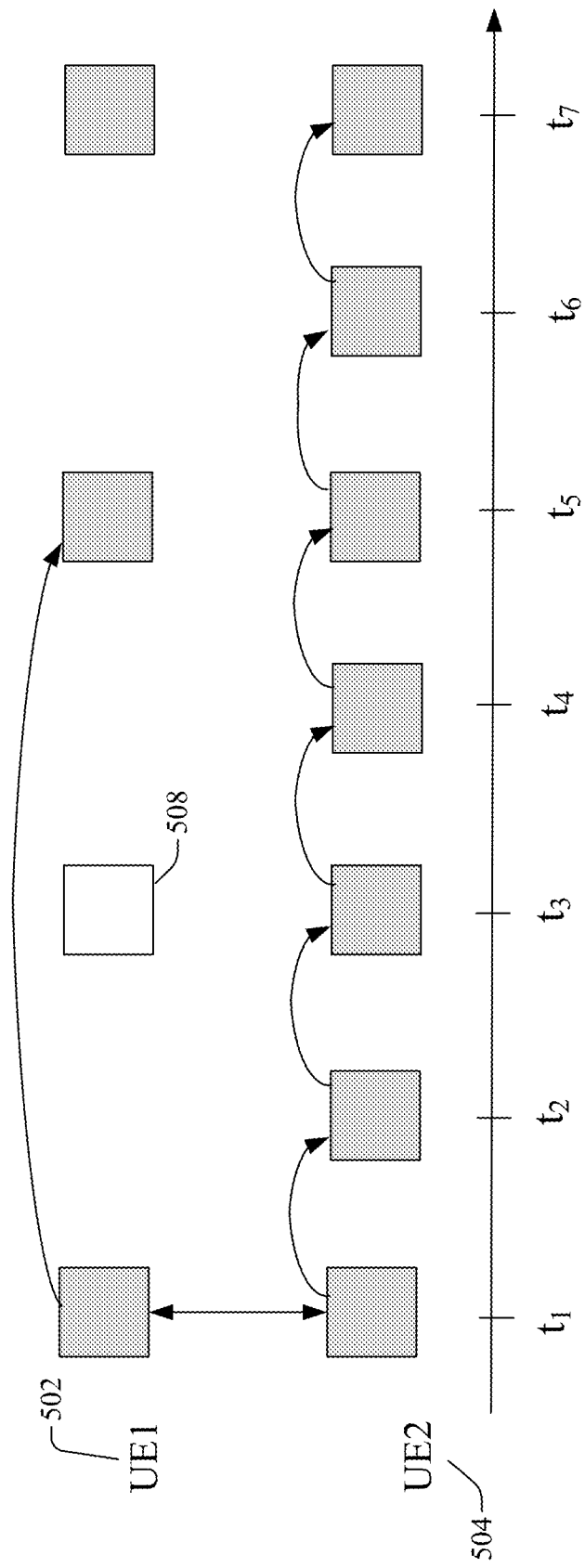
FIG. 5 is a diagram illustrating a unique collision condition with V2X autonomous selection when an evaluating UE has an RRP that is an integer multiple of a competing UE according to an aspect.

As highlighted above, if condition (3) exists, and the evaluating UEs RRP is an integer multiple of the competing UE's RRP, the situation looks like FIG. 5. As shown in FIG. 5, an evaluating UE 502 and a competing UE 504 both are performing periodic transmission and the scheduling of such will result in collisions due to occupying some of the same time-frequency resources. In this instance, the evaluating UE 502 will experience a collision at each and every transmission, while some fraction of transmissions of the competing UE 504 will experience a collision (based on the integer multiple of the RRP). When the evaluating UE 502 performs a monitoring operation 508 at $t_3$ instead of a data transmission and discovers the issue via the competing UE's SCI, the evaluating UE 502 may elect to discontinue transmission and instead initiate a re-selection process. Alternatively, upon detecting the condition the UE may choose to message the competing UE 504 with a request that the competing UE 504 skip the colliding resources in the certain periods where the collision would exist. In yet another alternative, the evaluating UE 502 may take into account its data priority and/or the data priority of the competing UE 504 in deciding which corrective action to take under such circumstances. For example if the data transmission priority of the competing UE is "high", instead of requesting the competing UE 504 to skip transmissions in the colliding time periods, the evaluating UE 502 may elect to discontinue transmission and initiate a re-selection procedure.

Figure 6:
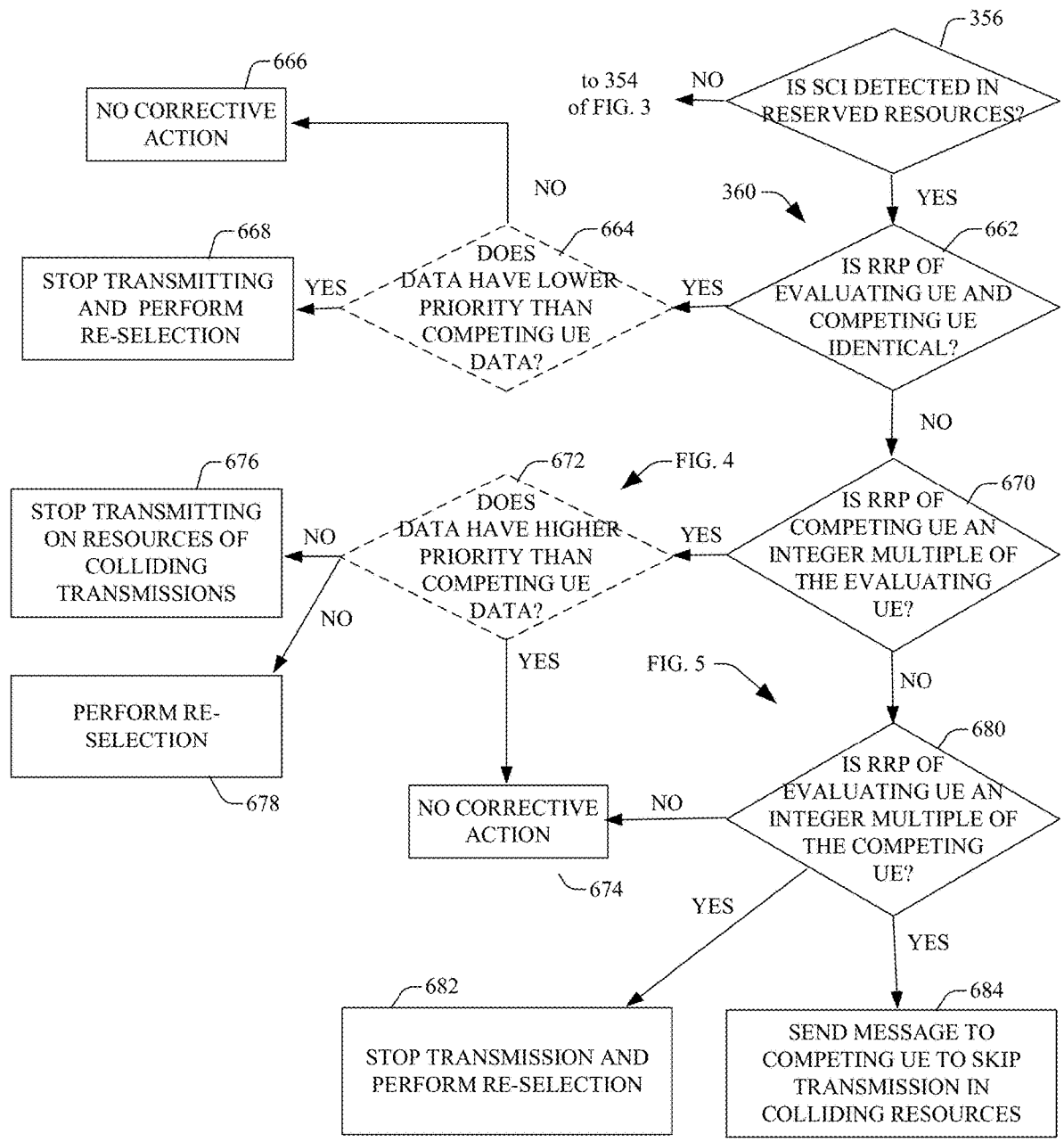
FIG. 6 is a flow diagram illustrating differing corrective actions depending upon the relative RRPs of the evaluating UE and a competing UE in a V2X autonomous selection process using a discontinuous periodic transmission scheme according to an aspect.

In summary, the variations in corrective action based on the three differing relationships between the evaluating UE's RRP and the competing UE's RRP is set forth in FIG. 6. FIG. 6 shows the functions performed by an evaluating UE's one or more processors. As shown in FIG. 3, when an affirmative answer is made at 356 to the query of whether an SCI is detected in the evaluating UE's reserved resources (YES at 356), a corrective action 360 is performed. FIG. 6 provides greater detail regarding what the corrective action may entail depending on the relationship of the RRPs between the evaluating UE and the competing UE.

Initially, the one or more processors of the evaluating UE compares its RRP with that of the competing UE via its decoded SCI. If the RRPs are the same (YES at 662), each transmission of each UE will collide, as illustrated in FIG.

3A. In one aspect the evaluating UE checks to see if its data priority is lower than the data priority of the competing UE at 664. If not (NO at 664), then the evaluating UE may elect to take no further corrective action at 666. This might reflect a situation where the evaluating UE has much higher priority data than the competing UE, and if the competing UE is also performing discontinuous periodic transmission, it will detect the collision, stop transmission and perform re-selection. If the determination is made that the data priority of the evaluating UE is lower than that of the competing UE (YES at 664), the evaluating UE stops transmitting and performs a re-selection procedure at 668. Note that the analysis at 664 regarding the data priority is optional (as represented by the dashed lines) and alternatively if the conclusion at 662 is affirmative (YES), the evaluating UE may proceed straight to 668, discontinue transmission, and perform re-selection.

Still referring to FIG. 6, if the RRPs of the evaluating UE and the competing UE are not identical (NO at 662), a determination is made whether the RRP of the competing UE is an integer multiple of the evaluating UE at 670. If it is (YES at 670), the situation illustrated in FIG. 4 exists, and the evaluating UE queries whether its data priority is higher than the data priority of the competing UE at 672. If the evaluating UE data priority is greater (YES at 672) no corrective action is taken at 674. That is, while there are clearly data collisions at 412 and 414, as shown in FIG. 4, because that evaluating UE's data priority is sufficiently high according to some predetermined standard, the evaluating UE may continue to transmit. If the competing UE is also performing discontinuous periodic transmission, it may detect the condition, and since it has a lower data priority, it may stop transmission and perform a re-selection. If the query at 672 is negative (NO at 672), the evaluating UE may elect one of two different options. In one case, the evaluating UE may stop transmitting solely with respect to the colliding resources at 676, as illustrated in FIG. 4, where resources 412 and 414 are cancelled, but transmission continues for the other evaluating UE resources. In another aspect, if the evaluating UE data priority is not "high" according to some predefined criteria, the evaluating UE discontinues all data transmission and initiates a re-selection process at 678. Again, the data priority analysis at 672 may be optional, as shown by the dashed lines Still referring to FIG. 6, if the result of the query at 670 is negative (NO at 670), then another query is made whether the RRP of the evaluating UE is an integer multiple of the competing UE at 680. If so (YES at 680), the situation is as illustrated in FIG. 5. Under these conditions the evaluating UE has two available options, wherein at 682 the evaluating UE stops transmission and performs a re-selection, or the evaluating UE sends a message to the competing UE to skip those transmissions associated with the colliding resources at 684. If however, the query at 680 is answered in the negative (NO at 680), then a situation exists where RRPs of the evaluating UE and the competing UE are mutually prime. For example, this situation would exist if the RRP of the evaluating UE was 30 ms and the RRP of the competing UE was 100 ms. In another alternative, if the RRP of the competing UE is 0, which means the competing UE only uses the resources once, and is not performing periodic transmissions. In such case, no corrective action is taken at 674.

In the examples provided in FIGS. 3-5, only a single set or block of resources are scheduled within each transmission period. In an alternative aspect, multiple, non-contiguous sets or blocks of resources may be scheduled for periodic transmission by a UE. This example is illustrated in FIG. 7A, where a first UE1 702 and a second UE2 704 are performing periodic transmission, wherein within each transmission period multiple, non-contiguous sets or blocks of time-frequency resources are scheduled for transmission. For example, the first UE1 702 has a first resource block 706 and a second resource block 708, while the second UE2 has a first resource block 710 and a second resource block 712 scheduled within each transmission period. As illustrated in FIG. 7A, according to the scheduling, the first resource blocks 706, 710 of the UEs 702, 704 do not collide, but the second resource blocks 708, 712 do collide.

In one aspect, during a third time period 714, the first UE1 702 does not transmit, but instead performs a monitoring operation 716 where it listens to the channel for the SCI of other competing UEs. In this case, UE1 702 detects the SCI of UE2 704, decodes it, and determines that the second resource blocks 708, 712 collide, and thus a corrective action must take place. In one aspect, as illustrated in FIG. 7A, the first UE1 702 (i.e., the evaluating UE) stops all further transmissions on all the reserved resources, which in this case corresponds to both resource blocks 706, 708, and performs a re-selection procedure. In an alternative aspect, as illustrated in FIG. 7B, in a similar situation wherein only a portion of the scheduled resources collide (i.e., resource blocks 708, 712 collide, but resource blocks 706, 710 do not collide), the evaluating UE 702 discontinues transmissions only on the collided resources in the subsequent transmission periods, and optionally performs a re-selection procedure solely for the colliding resources.

Figure 8A:
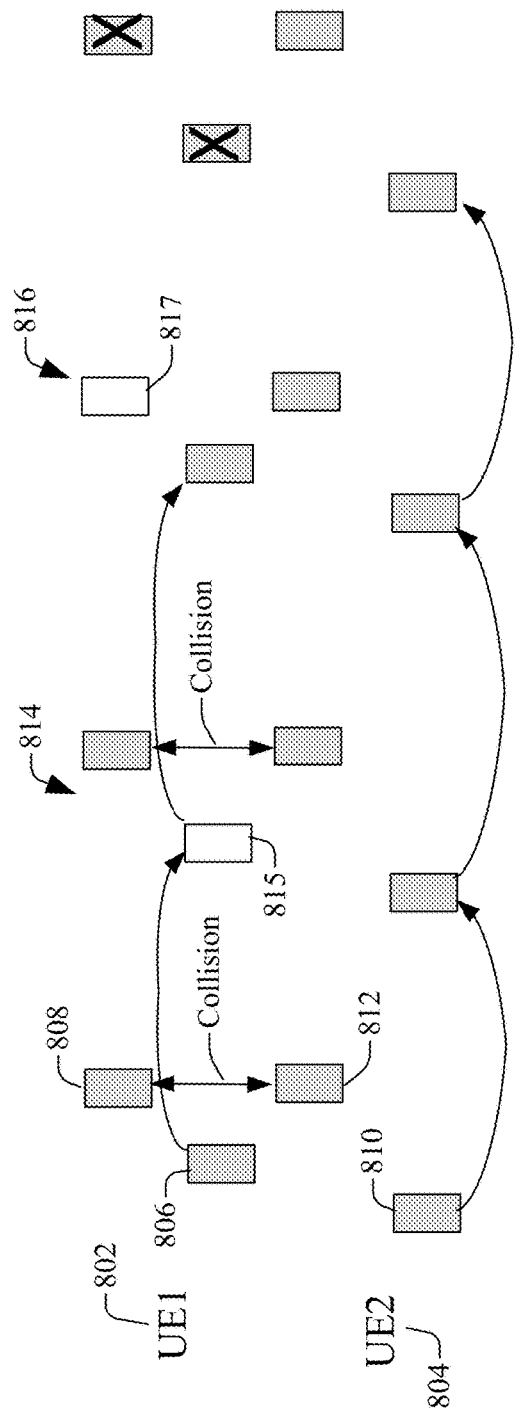
FIGS. 8A-8B are diagrams illustrating discontinuous periodic transmission schemes in instances where multiple, non-contiguous resource blocks are scheduled in each transmission period according to various aspects.

In the examples of FIGS. 7A-7B, the evaluating UE 702 performed its monitoring operation for each resource block 706, 708 within the same transmission period 714. Alternatively, an evaluating UE may schedule and thus perform a monitoring operation for each of the resource blocks in different transmission periods. For example as illustrated in FIG. 8A, a first UE1 802 transmits in each transmission period according to scheduled resource blocks 806, 808, while a second UE2 804 transmits in each transmission period according to scheduled resource blocks 810, 812. As shown in FIG. 8A, the first resource blocks 806, 810 of the UEs 802, 804 do not collide, while the second resource blocks 808, 812 of the UEs 802, 804 do experience a collision. In contrast to FIG. 7A where the evaluating UE 702 performs a monitoring operation for both blocks 706, 708 in the same transmission period 714, in the aspect of FIG. 8A, the evaluating UE 802 monitors 815 for the first block 806 in a second transmission period 814, and monitors 817 for the second block 808 in a third transmission period 816. As illustrated, the evaluating UE 802 does not detect a conflicting resource with respect to block 806 in the second transmission period 814, but does detect a collision with respect to the block 808 in the third transmission period 816. In one aspect, as illustrated in FIG. 8A, the corrective action taken by the evaluating UE 802 is to discontinue transmission of all resources and perform a re-selection procedure for all the resources.

Figure 8B:
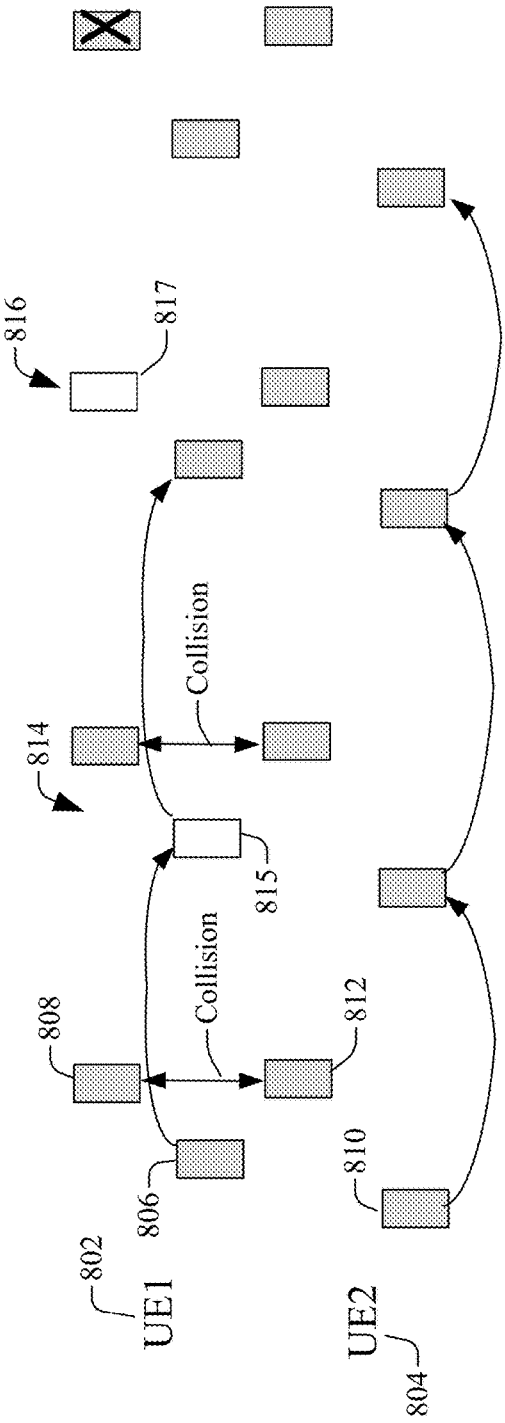

In an alternative aspect illustrated in FIG. 8B, a similar collision condition is detected, that is, a partial collision is detected. More particularly, a collision is detected for some (i.e., resource 808), but not all the resources (i.e., resources 806 and 808). In this aspect, the corrective action taken by the evaluating UE 802 is to discontinue transmission of only the colliding resource (i.e., resource 808) while continuing transmission of the other non-colliding resources, as shown in FIG. 8B. In yet another alternative, the corrective action may be conditioned upon other criteria. For example, a priority of the data associated with the reserved resource block may be considered. If the priority of the data associated with the colliding resource block is "high" (e.g., it exceeds a predetermined threshold), the colliding resource is re-scheduled, and if it is not a "high" priority, the evaluating UE 802 simply discontinues transmission on that colliding resource, and maintains transmission on the non-colliding resource.

In one aspect, this discontinuous periodic transmission scheme highlighted herein may be selectively enabled or disabled, and in another aspect it may be a fixed solution or may be configured or preconfigured per resource pool. Either alternative is contemplated by the present disclosure.

As discussed above, the problem associated with collisions in periodic transmission is addressed by an evaluating UE discontinuing its periodic transmission and performing a monitoring operation during the time period it would otherwise be transmitting in order to determine whether a competing UE exists that has reserved resources that will conflict with those of the evaluating UE in a manner discussed herein and illustrated in FIGS. 3A, 4-5, 7A-7B and 8A-8B. One or more ways in which the monitoring function is scheduled to form a discontinuous periodic transmission is described below.

In one aspect of the present disclosure, prior to each transmission on resources in a given period, the UE determines whether or not to transmit on the next transmission period, and if a determination is made to transmit, the UE populates its SCI field accordingly. In one aspect, the determination whether or not to transmit (or monitor) on the next transmission period is made based on a random selection of whether to monitor in the next period, wherein the random selection has a probability (A) that may be configured or preconfigured, or based on criteria such as data priority. For example, if the probability (A) is configured or preconfigured to be 10%, then the chance that the evaluating UE will choose to not transmit, but instead monitor during the next transmission period will be 10%.

In accordance with an alternative aspect, the probability (A) may depend on various criteria, for example, in one aspect the probability (A) may depend upon the data priority. For example, in one aspect, the probability (A) may be increased for high priority data to ensure reliable data transmissions, and decreased for low priority data. Alternatively, the probability (A) may be decreased for high priority data to achieve more continuous data transmissions, and increased for low priority data to avoid collisions with higher priority data in competing UEs.

In accordance with another alternative aspect, the probability (A) may depend upon collision history. If a relatively high number of collision were detected (according to some predetermined threshold or criteria) in a recent predefined time period, the probability (A) may be increased to monitor more frequently, and if the recent history showed no or infrequent collisions, the probability (A) may be decreased. In other aspects, multiple factors or criteria may be collectively considered in forming or otherwise configuring the probability (A).

In addition, for non-contiguous multiple resources reserved in each transmission period, such as that illustrated in FIG. 8A, the probability may be independently applied to each of the various scheduled resources in the time period.

In another aspect, the monitoring of the evaluating UE may follow a predetermined pattern or periodicity. For example, in one aspect, the periodic transmissions are discontinuous due to monitoring every "B" time periods. The value B may be (pre)configured or may be randomly selected from a set of preconfigured periods. For example, the set may be mutually prime number such as {2, 3, 5, 7, 11} which may avoid consecutive identical discontinuous resources from different UEs. In another aspect, the selection of the value B may depend upon data priority. For example, the value B may be selected to be a lower value for high priority data to monitor more often to ensure more reliable transmission, and B made larger for lower priority data. In another aspect, B may be higher for high priority data to ensure more continuous transmission for such data. In addition, in one aspect, once the periodicity B is selected, the starting point needs to be determined as well. In one aspect, the starting period of the discontinuous resource time period may be randomly selected between 0 and B−1. Alternatively, the starting point can be configured or preconfigured, or based on other criteria.

Figure 9:
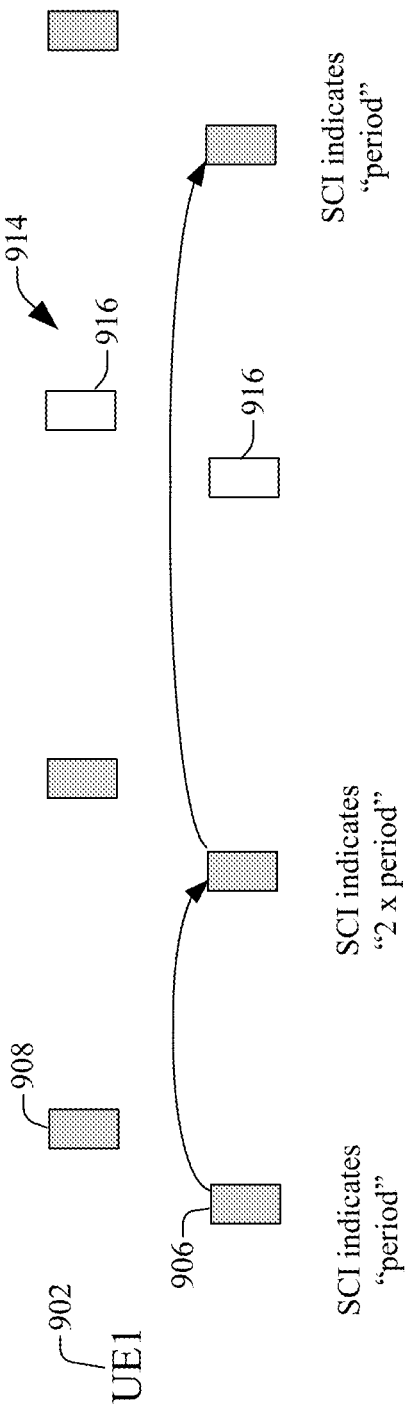
FIG. 9 is a diagram that illustrates the signaling performed to "skip" a transmission period to effectuate the discontinuous periodic transmission.

The above discussion discloses determining how often to make the otherwise periodic transmission discontinuous by scheduling the monitoring operation. The manner in which such discontinuous transmission is signaled can be performed in a variety of different ways. In one aspect, if the evaluating UE determines a discontinuous transmission in the next time period, the evaluating UE alters the RRP (i.e., the resource reservation period) field of the SCI to skip the next transmission time period. In one aspect, if the present RRP is set to 100 ms, the evaluating UE sets the RRP in the SCI that is associated with PSSCH one period before the discontinuous transmission to 200 ms (double the periodicity). In another example, if the RRP is set to 400 ms, the RRP for the SCI one period before the discontinuous transmission is set to 800 ms to double the periodicity and effectively "skip" that particular transmission period so it can be utilized to monitor the channel. One example of this feature is illustrated in FIG. 9, wherein the SCI field indicates one period for the normal periodic transmission, and then indicates "2×period" on the period prior to the monitoring operation 914, to indicate that the transmission on the scheduled resources skips to the "next" transmission period after the discontinuous (monitoring) time period.

In another aspect, an additional bit may be employed in the SCI field to indicate a discontinuous transmission in the next transmission period. For example, if the extra bit is set to "0", for example, the resource in the next transmission period is reserved and periodic transmission continues. If the extra bit is set to "1", for example, the resource in the next transmission period is not reserved and monitoring may be performed, and the resource will be reserved for transmission in the period following the monitoring period.

In various aspects discussed above, a discontinuous periodic transmission scheme is disclosed, wherein an evaluating UE stops transmitting during a discontinuous time period to monitor the channel for potential collisions. In another aspect, periodic transmission is not discontinued, but instead a transmitting UE operates as an evaluating UE and performs a self-detection of collision operation by evaluating the feedback from one or more receiving UEs when HARQ feedback is enabled. Alternatively, the transmitting UE operates as an evaluating UE by looking for HARQ feedback on sideline feedback channel (PSFCH) resources that correspond to PSCCH and PSSCH transmissions by other transmitting UEs to inferentially ascertain collisions when HARQ feedback is disabled.

In one aspect, self-detection of a collision may be performed by a transmitting UE performing a periodic transmission. For example, in a sidelink unicast or groupcast transmission with HARQ feedback enabled, the transmitting UE can evaluate the received feedback over a number of evaluated feedback messages, and calculate what percentage of such messages are negative acknowledgements (NACKs). If the percentage of such NACKs exceeds a predetermined threshold, then it is determined that a collision exists with a competing UE with respect to the scheduled resources.

As is known, a unicast transmission is a one-to-one communication, wherein a transmitting UE is transmitting the periodic transmission to a single, specific receiving UE. In response to the unicast transmission, the transmitting UE receives a response to the sidelink data packet from the receiving UE when HARQ feedback is enabled. In general, a HARQ-ACK is a response that indicates whether a sidelink data packet was successfully received. Available HARQ-ACK responses include, inter alia, positive acknowledgement (ACK), negative acknowledgement (NACK), and DTX. As only an ACK indicates a successful receipt of the transmitted data, either a NACK or a DTX is deemed to be a "NACK" for purposes of this disclosure, and thus represent an unsuccessful transmission that may be due to a collision. Thus, in a periodic transmission, for successive transmissions of the data, receipt of NACK or DTX is counted as a "fail" while an ACK is treated as a "success." If the percentage of "fails" is larger than a threshold, then the transmitting UE concludes that a collision exists with respect to the scheduled periodic resources. In such instances a corrective action is performed, for example, where the periodic transmission is discontinued and a re-selection procedure is initiated.

In one aspect the threshold used to conclude a collision has occurred is preconfigured or configured. In another aspect, the threshold may be based on a data quality-of-service (QoS) parameter or a data priority level. For example, if the QoS or data priority is high, the threshold may be lower to trigger a re-selection operation if there is only a remote possibility that a collision exists.

Figure 10:
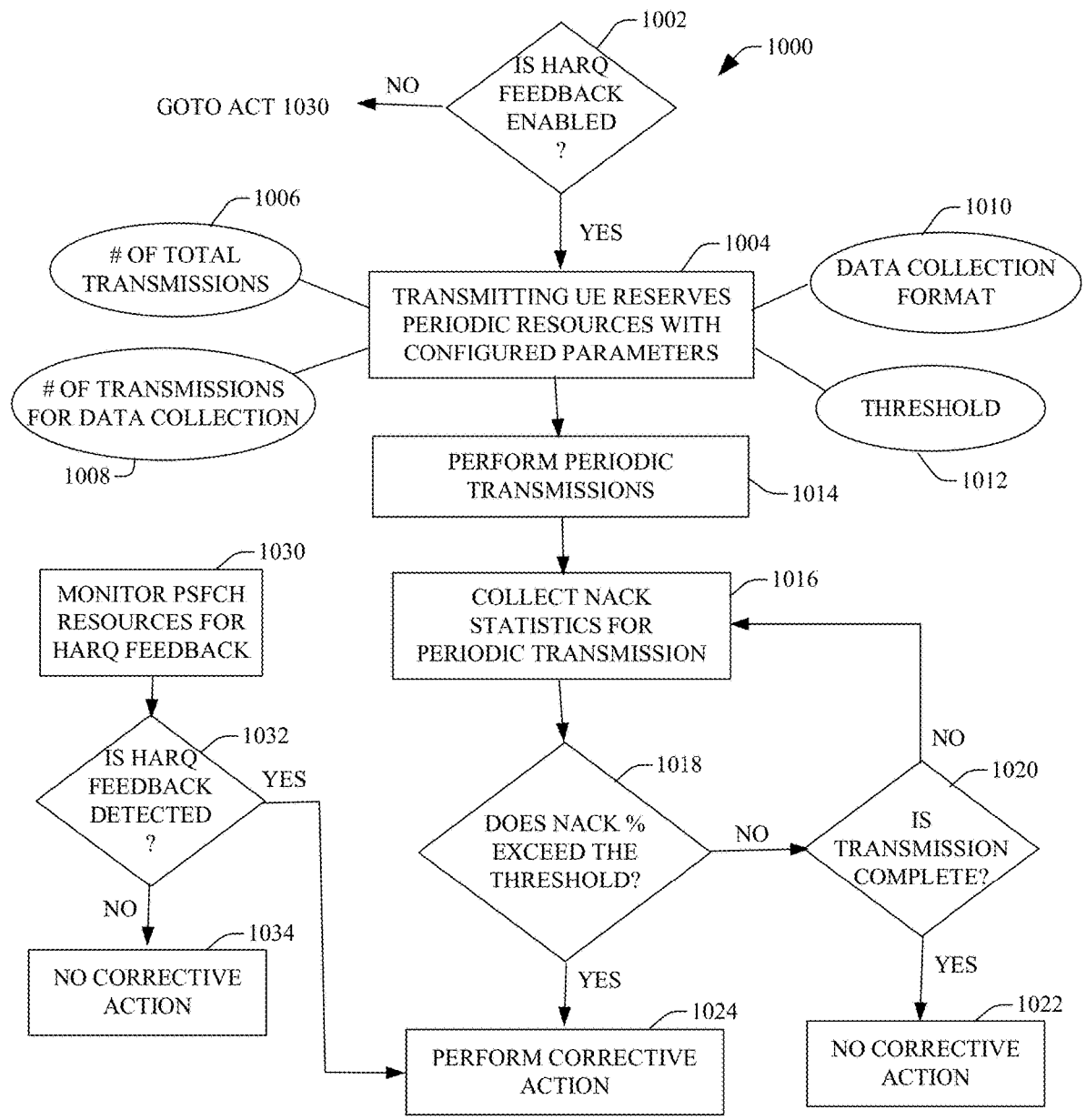
FIG. 10 is a flow diagram illustrating functions of one or more processors of an evaluating UE performing a self-collision detection scheme using HARQ feedback information.

Referring to FIG. 10, a UE for self-detecting collisions 1000 in a periodic communication environment employing, for example, autonomous selection is provided. Such a UE is a transmitting UE that also operates as an evaluating UE to detect collisions with competing UEs. FIG. 10 also may correspond to a method of performing self-detection of collisions in the above environment using or more processors, and further may entail non-transitory computer readable media containing instructions that when executed by one or more processors performs the method described herein.

In one aspect, the functionality 1000 begins at 1002, wherein a query is made whether HARQ feedback is enabled in the UE. As the standard allows for HARQ feedback to be selectively enabled, the functionality 1000 provides for two different options. If HARQ feedback is enabled (YES at 1002), then the transmitting UE will receive ACK/NACK type feedback in response to the periodic transmissions.

Upon knowledge of HARQ feedback being enabled, the transmitting UE receives resources for periodic communication and schedules such resources with one or more feedback-based collision detection parameters at 1004. Non-limiting examples of such feedback-based collision detection parameters may be as follows. One parameter may be a number of total transmissions 1006 in the periodic transmission. For example, if the transmitting UE is associated with a vehicle, it may be transmitting a vehicle velocity periodically a total number of 100 times, or 500 times, before it needs to reschedule. This information may also include a period to dictate how frequently such data is to be transmitted. Another feedback collision detection parameter may be a number of data collection transmissions 1008 for collecting NACK statistics. In one example, if the total number of periodic transmissions is 100, the number of transmissions to be used or evaluated for collecting NACK statistics may be 10. Thus the UE will evaluate the first 10 HARQ feedbacks with respect to the 100 transmissions and make its decision based on the 10 pieces of HARQ feedback data.

Still referring to FIG. 10, another feedback collision detection parameter may include a data collection format 1010. For example, in the example already provided, the analysis of potential collision may be based on 10/100 transmissions. In one data format 1010 only the first 10 pieces of HARQ feedback data are considered. In another aspect, each subsequent set of 10 pieces of HARQ feedback information are evaluated throughout the entire transmission, such that transmissions 1-10 are evaluated, then 11-20, then 21-30, and so on. In another aspect, the data collection format may be a sliding window, where pieces of HARQ feedback information 1-10 are evaluated, then 5-15 are evaluated, then 10-20, then 15-25, and so on. The data collection format 1010 allows flexibility in customizing a manner in which the self-collision data analysis will be conducted.

Another feedback collision detection parameter is a threshold 1012. For example, as NACK statistics are collected, the percentage of received NACKs can be compared to the threshold, and if the NACK percentage exceeds the threshold, a conclusion is made that a collision exists on the scheduled resources. For example, if 10 of the 100 transmissions are evaluated with respect to their HARQ feedback responses, and 2 of the 10 HARQ feedback responses were NACKs, then the NACK percentage is 20%. If the threshold 1012 is 30% a conclusion is made that no collision exists, whereas if the threshold is 10% a conclusion is made that a collision has occurred with a competing UE on the reserved resources.

Referring back to FIG. 10, once the reserved resources are scheduled with the feedback-based collision detection parameters at 1004, a periodic transmission is initiated and takes place at 1014 by the transmitting UE. As the periodic transmission is taking place at 1014, NACK statistics are collected at the transmitting UE at 1016 via the HARQ feedback, and such NACK statistics are collected according to one or more of the feedback-based collision detection parameters. The process 1000 continues to 1018, wherein the NACK statistics are converted to a percentage, for example, and compared to the threshold 1012. If the threshold is not exceeded (NO at 1018), a conclusion may be made that no collision presently exists with respect to the reserved resources, and if the periodic transmission is still continuing (NO at 1020), additional NACK statistics may be collected depending on the data collection format 1010. If periodic transmission has completed (YES at 1020), then no corrective action is needed, as no resource collision has been detected.

Referring back to act 1018 of FIG. 10, if the computed NACK percentage does exceed the threshold (YES at 1018), then a conclusion is made that a collision has occurred and a corrective action is selectively performed at 1024. In one aspect, the corrective action is to discontinue the periodic transmission and initiate a re-selection process. In one aspect, the corrective action may be selective based on various other criteria.

Returning to query 1002 in FIG. 10, if the HARQ feedback is not enabled (NO at 1002), then the transmitting UE will not be receiving HARQ feedback information. However, if other competing UEs are transmitting and employing HARQ feedback, then such information may be detected by the evaluating UE on a feedback channel, such as the physical sidelink feedback channel (PSFCH) at 1030. If during a monitoring the PSFCH, HARQ feedback is detected (YES at 1032), then an inference can be made that the periodic transmission made by the evaluating UE is colliding with a transmission of a competing UE, and a corrective action is performed at 1024. In one example, the corrective action is discontinuing the periodic transmission and initiating a re-selection process. If no HARQ feedback is detected on PSFCH, for example (NO at 1032), then a conclusion is made that no collision exists, and no corrective action is taken at 1034. For example, the periodic transmission of the evaluating UE continues.

In the descriptions above, description is made in conjunction with several flow diagrams outlining example methods. In this description and in the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. "Derive" should be construed to encompass computing or calculating the entity or value of the entity based on other quantities or entities. "Derive" should be construed to encompass any manner of deducing or identifying an entity or value of the entity.

Figure 11:
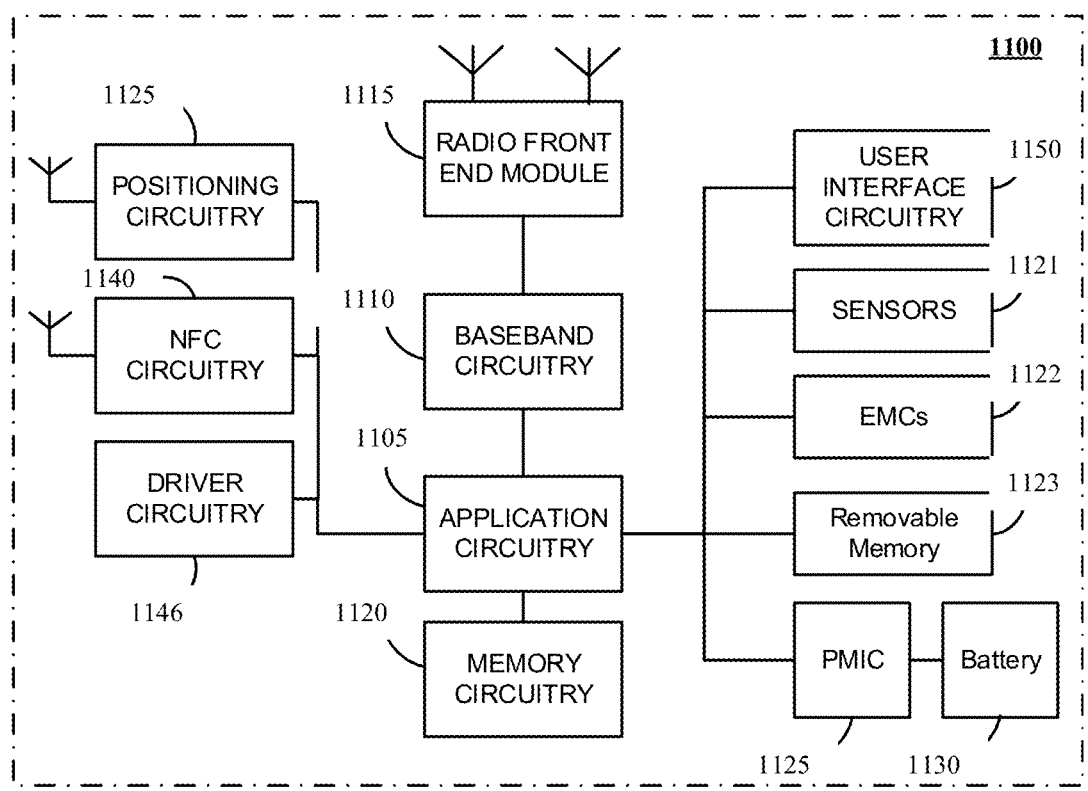
FIG. 11 is a block diagram illustrating a UE and various components thereof according to an aspect.

As described herein, for purposes of discussion, each vehicle employing V2X communication principles are described as a UE (i.e., user equipment). FIG. 11 illustrates a non-limiting example of a platform 1100 (or "device 1100") in accordance with various aspects that may constitute circuitry that makes up a UE. In aspects, the computer platform 1100 may be suitable for use as UEs and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1105 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1105 may be coupled with or may include memory/storage elements and may be configured to execute instructions stored in the memory/storage to enable various applications or operating systems to run on the system 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 1105 may include a general or special purpose processor, such as an A-series processor (e.g., the A13 Bionic), available from Apple® Inc., Cupertino, California or any other such processor. The processors of the application circuitry 905 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-ft and Cortex-M family of processors; or the like. In some implementations, the application circuitry 1105 may be a part of a system on a chip (SoC) in which the application circuitry 1105 and other components are formed into a single integrated circuit, or a single package.

The baseband circuitry 1110 may be implemented, for example, as a solder-down substrate including one or more integrated circuits, a single packaged integrated circuit soldered to a main circuit board or a multi-chip module containing two or more integrated circuits.

The platform 1100 may also include interface circuitry (not shown) that is used to connect external devices with the platform 1100. The external devices connected to the platform 1100 via the interface circuitry include sensor circuitry 1121 and electro-mechanical components (EMCs) 1122, as well as removable memory devices coupled to removable memory circuitry 1123.

A battery 1130 may power the platform 1100, and may have a power supply coupled to an electrical grid. The battery 1130 may be a lithium ion battery, a metal-air battery, such as a zinc-air battery, an aluminum-air battery, a lithium-air battery, and the like. In some implementations, such as in V2X applications, the battery 1130 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

EXAMPLES

Example 1 is an evaluating user equipment (UE) that comprises memory and one or more processors communicatively coupled to the memory. The one or more processor are configured to schedule periodic resources with one or more configured feedback-based collision detection parameters, and perform a periodic transmission to one or more receiving UEs. The one or more processors are further configured to collect negative acknowledgement (NACK) statistics for the periodic transmission according to the configured feedback-based collision detection parameters, and selectively perform corrective action based on the collected NACK statistics and at least one of the configured feedback-based collision detection parameters.

Example 2 includes the subject matter of example 1, wherein one of the feedback-based collision detection parameters comprises a number of total transmissions in the periodic transmission.

Example 3 includes the subject matter of example 2, wherein one of the feedback-based collision detection parameters comprises a number of data collection transmissions for collecting the NACK statistics that is a subset of the number of total transmissions in the periodic transmission.

Example 4 includes the subject matter of example 3, wherein the NACK statistics comprise a percentage of the number of data collection transmissions that comprise NACK feedback data.

Example 5 includes the subject matter of example 4, wherein one of the feedback-based collision detection parameters comprises a threshold relating to a percentage of the number of data collection transmissions that comprises NACK feedback data.

Example 6 includes the subject matter of example 5, wherein the one or more processors, in collecting NACK statistics, are configured to calculate a percentage of data collection transmissions having NACK feedback data associated therewith, and compare the calculated percentage to the threshold.

Example 7 includes the subject matter of example 6, wherein the one or more processors are configured to selectively perform corrective action when the calculated percentage exceeds the threshold by discontinuing the periodic transmission and initiating a re-selection procedure to schedule resources for periodic transmission.

Example 8 includes the subject matter of example 6, wherein the one or more processors are configured to selectively perform correction action by taking no corrective action when the calculated percentage does not exceed the threshold and allowing the periodic transmission to continue.

Example 9 includes the subject matter of example 5, wherein the threshold is configured or preconfigured.

Example 10 includes the subject matter of example 5, wherein the threshold is based on a quality-of-service (QoS) or a data priority associated with the periodic transmission.

Example 11 includes the subject matter of example 1, wherein the feedback collection detection parameters comprise a data collection format for HARQ feedback data.

Example 12 is an evaluating user equipment (UE) that comprises memory and one or more processors communicatively coupled to the memory. The one or more processor are configured to monitor a feedback channel associated with another UE for hybrid automatic repeat request (HARQ) feedback information when performing a periodic transmission, and selectively perform corrective action on the periodic transmission based on whether HARQ feedback information is detected on the feedback channel.

Example 13 includes the subject matter of example 12, wherein the feedback channel comprises a physical sideline feedback channel (PSFCH).

Example 14 includes the subject matter of example 12, wherein the one or more processors are configured to perform selective correction by taking no corrective action and continuing the periodic transmission when HARQ feedback information is not detected on the feedback channel.

Example 15 includes the subject matter of example 12, wherein the one or more processors are configured to perform selective correction by discontinuing a periodic transmission and initiating a re-selection process to schedule resources when HARQ feedback information is detected on the feedback channel.

Example 16 includes the subject matter of example 12, wherein the one or more processors are configured to perform selective correction by discontinuing a periodic transmission and initiating a re-selection process to schedule resources when an amount of HARQ feedback information detected on the feedback channel exceeds a predetermined amount or a predetermined threshold.

Example 17 includes the subject matter of example 12, wherein the one or more processors are configured to perform selective correction by taking no corrective action and continuing the periodic transmission when HARQ feedback information does not exceed a predetermined amount or a predetermined threshold.

Example 18 is a method of performing user equipment (UE) autonomous selection in an evaluating UE within a vehicle-to-anything (V2X) communication environment. The method comprises scheduling periodic resources with one or more configured feedback-based collision detection parameters using one or more processors and performing a periodic transmission to one or more receiving UEs using the one or more processors. The method also comprises collecting negative acknowledgement (NACK) statistics for the periodic transmission according to the configured feedback-based collision detection parameters using the one or more processors, and selectively performing corrective action based on the collected NACK statistics and at least one of the configured feedback-based collision detection parameters using the one or more processors.

Example 19 includes the subject matter of example 18, wherein one of the feedback-based collision detection parameters comprises a number of total transmissions in the periodic transmission.

Example 20 includes the subject matter of example 19, wherein one of the feedback-based collision detection parameters comprises a number of data collection transmissions for collecting the NACK statistics that is a subset of the number of total transmissions in the periodic transmission.

Example 21 includes the subject matter of example 20, wherein the NACK statistics comprise a percentage of the number of data collection transmissions that comprise NACK HARQ feedback data.

Example 22 includes the subject matter of example 21, wherein one of the feedback-based collision detection parameters comprises a threshold relating to a percentage of the number of data collection transmissions that comprises NACK feedback data.

Example 23 includes the subject matter of example 22, wherein the one or more processors, in collecting NACK statistics, are configured to calculate a percentage of data collection transmissions having NACK feedback data associated therewith, and compare the calculated percentage to the threshold.

Example 24 includes the subject matter of example 23, wherein the one or more processors are configured to selectively perform corrective action when the calculated percentage exceeds the threshold by discontinuing the periodic transmission and initiating a re-selection procedure to schedule resources for periodic transmission.

Example 25 includes the subject matter of example 23, wherein the one or more processors are configured to selectively perform correction action by taking no corrective action when the calculated percentage does not exceed the threshold and allowing the periodic transmission to continue.

Example 26 includes the subject matter of example 22, wherein the threshold is configured to preconfigured.

Example 27 includes the subject matter of example 22, wherein the threshold is based on a quality-of-service (QoS) or a data priority associated with the periodic transmission.

Example 28 includes the subject matter of example 18, wherein the feedback-based collision detection parameters comprise a data collection format for HARQ feedback data.

Example 29 is a method of performing user equipment (UE) autonomous selection in an evaluating UE within a vehicle-to-anything (V2X) communication environment. The method comprises monitoring a feedback channel associated with another UE for hybrid automatic repeat request (HARQ) feedback information when performing a periodic transmission, and selectively performing corrective action on the periodic transmission based on whether HARQ feedback information is detected on the feedback channel.

Example 30 includes the subject matter of example 29, wherein the feedback channel comprises a physical sideline feedback channel (PSFCH).

Example 31 includes the subject matter of example 29, wherein the one or more processors are configured to perform selective correction by taking no corrective action and continuing the periodic transmission when HARQ feedback information is not detected on the feedback channel.

Example 32 includes the subject matter of example 29, wherein the one or more processors are configured to perform selective correction by discontinuing a periodic transmission and initiating a re-selection process to schedule resources when HARQ feedback information is detected on the feedback channel.

Example 33 includes the subject matter of example 29, wherein the one or more processors are configured to perform selective correction by discontinuing a periodic transmission and initiating a re-selection process to schedule resources when an amount of HARQ feedback information detected on the feedback channel exceeds a predetermined amount or a predetermined threshold.

Example 34 includes the subject matter of example 29, wherein the one or more processors are configured to perform selective correction by taking no corrective action and continuing the periodic transmission when HARQ feedback information does not exceed a predetermined amount or a predetermined threshold.

Example 35 is a non-transitory computer readable medium containing instructions, wherein such instructions when executed by one or more processors are configured to perform a method of performing user equipment (UE) autonomous selection in an evaluating UE. The method comprises scheduling periodic resources with one or more configured feedback-based collision detection parameters using the one or more processors, and performing a periodic transmission to one or more receiving UEs using the one or more processors. The method also comprises collecting negative acknowledgement (NACK) statistics for the periodic transmission according to the configured feedback-based collision detection parameters using the one or more processors, and selectively performing corrective action based on the collected NACK statistics and at least one of the configured feedback-based collision detection parameters using the one or more processors.

Example 36 includes the subject matter of example 35, wherein one of the feedback-based collision detection parameters comprises a number of total transmissions in the periodic transmission.

Example 37 includes the subject matter of example 36, wherein one of the feedback-based collision detection parameters comprises a number of data collection transmissions for collecting the NACK statistics that is a subset of the number of total transmissions in the periodic transmission.

Example 38 includes the subject matter of example 37, wherein the NACK statistics comprise a percentage of the number of data collection transmissions that comprise NACK feedback data.

Example 39 includes the subject matter of example 38, wherein one of the feedback-based collision detection parameters comprises a threshold relating to a percentage of the number of data collection transmissions that comprises NACK feedback data.

Example 40 includes the subject matter of example 39, wherein the one or more processors, in collecting NACK statistics, are configured to calculate a percentage of data collection transmissions having NACK feedback data associated therewith, and compare the calculated percentage to the threshold.

Example 41 includes the subject matter of example 40, wherein the one or more processors are configured to selectively perform corrective action when the calculated percentage exceeds the threshold by discontinuing the periodic transmission and initiating a re-selection procedure to schedule resources for periodic transmission.

Example 42 includes the subject matter of example 40, wherein the one or more processors are configured to selectively perform correction action by taking no corrective action when the calculated percentage does not exceed the threshold and allowing the periodic transmission to continue.

Example 43 includes the subject matter of example 39, wherein the threshold is configured to preconfigured.

Example 44 includes the subject matter of example 39, wherein the threshold is based on a quality-of-service (QoS) or a data priority associated with the periodic transmission.

Example 45 includes the subject matter of example 35, wherein the feedback-based collision detection parameters comprise a data collection format for HARQ feedback data.

Example 46 is a non-transitory computer readable medium containing instructions, wherein such instructions when executed by one or more processors are configured to perform a method of performing user equipment (UE) autonomous selection in an evaluating UE. The method comprises monitoring a feedback channel associated with another UE for hybrid automatic repeat request (HARQ) feedback information when performing a periodic transmission, and selectively performing corrective action on the periodic transmission based on whether HARQ feedback information is detected on the feedback channel.

Example 47 includes the subject matter of example 46, wherein the feedback channel comprises a physical sideline feedback channel (PSFCH).

Example 48 includes the subject matter of example 46, wherein the one or more processors are configured to perform selective correction by taking no corrective action and continuing the periodic transmission when HARQ feedback information is not detected on the feedback channel.

Example 49 includes the subject matter of example 46, wherein the one or more processors are configured to perform selective correction by discontinuing a periodic transmission and initiating a re-selection process to schedule resources when HARQ feedback information is detected on the feedback channel.

Example 50 includes the subject matter of example 46, wherein the one or more processors are configured to perform selective correction by discontinuing a periodic transmission and initiating a re-selection process to schedule resources when an amount of HARQ feedback information detected on the feedback channel exceeds a predetermined amount or a predetermined threshold.

Example 51 includes the subject matter of example 46, wherein the one or more processors are configured to perform selective correction by taking no corrective action and continuing the periodic transmission when HARQ feedback information does not exceed a predetermined amount or a predetermined threshold.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor configured to perform operations comprising:
   outputting a periodic transmission to one or more receiving UEs;
   collecting negative acknowledgement (NACK) statistics for the periodic transmission according to one or more feedback-based collision detection parameters, wherein the one or more feedback-based collision detection parameters indicate that the NACK statistics are grouped into a plurality of datasets corresponding to different sets of transmissions for the periodic transmission; and
   performing corrective action based on the collected NACK statistics and at least one of the one or more feedback-based collision detection parameters, wherein the plurality of datasets are sequentially evaluated to determine whether to perform the corrective action.

2. The baseband processor of claim 1, wherein one of the one or more feedback-based collision detection parameters comprises a number of total transmissions in the periodic transmission).

3. The baseband processor of claim 2, wherein one of the one or more feedback-based collision detection parameters comprises a number of data collection transmissions for collecting the NACK statistics that is a subset of the number of total transmissions in the periodic transmission.

4. The baseband processor of claim 3, wherein the NACK statistics comprise a percentage of the number of data collection transmissions that comprise NACK feedback data).

5. The baseband processor of claim 4, wherein one of the one or more feedback-based collision detection parameters comprises a threshold relating to a percentage of the number of data collection transmissions that comprises NACK feedback data.

6. The baseband processor of claim 5, further configured to, in collecting NACK statistics, calculate a percentage of data collection transmissions having NACK feedback data associated therewith, and compare the calculated percentage to the threshold.

7. The baseband processor of claim 6, further configured to perform corrective action when the calculated percentage exceeds the threshold by discontinuing the periodic transmission and initiating a procedure to schedule resources for periodic transmission.

8. The baseband processor of claim 6, further configured to perform correction action by taking no corrective action when the calculated percentage does not exceed the threshold and allowing the periodic transmission to continue.

9. The baseband processor of claim 5, wherein the threshold is configured or preconfigured.

10. The baseband processor of claim 5, wherein the threshold is based on a quality-of-service (QoS) associated with the periodic transmission.

11. The baseband processor of claim 1, wherein the one or more feedback-based collision detection parameters indicates that the NACK statistics are grouped into the plurality of datasets according to a sliding time window, and wherein one of the plurality of datasets corresponds to a total number of transmissions different than a total number of transmissions to which another one of the plurality of datasets corresponds.

12. A User Equipment (UE) device, comprising:
radio frequency (RF) circuitry; and
a processor, coupled to the RF circuitry, and configured to cause the UE to:
monitor a feedback channel associated with another UE for hybrid automatic repeat request (HARQ) feedback information when performing a periodic transmission to the other UE, wherein the HARQ feedback information is grouped into a plurality of datasets corresponding to different sets of transmissions for the periodic transmission; and
perform corrective action on the periodic transmission based on the HARQ feedback information, wherein the plurality of datasets are sequentially evaluated to determine whether to perform the corrective action.

13. The UE of claim 12, wherein the HARQ feedback information is grouped into the plurality of datasets such that the plurality of datasets are non-overlapping.

14. The UE of claim 12, further configured to perform correction by taking no corrective action and continuing the periodic transmission when HARQ feedback information is not detected on the feedback channel.

15. The UE of claim 12, further configured to perform correction by discontinuing a periodic transmission and initiating a re-selection process to schedule resources when HARQ feedback information is detected on the feedback channel.

16. The UE of claim 12, further configured to perform correction by discontinuing a periodic transmission and initiating a re-selection process to schedule resources when an amount of HARQ feedback information detected on the feedback channel exceeds a predetermined amount or a predetermined threshold.

17. The UE of claim 12, further configured to perform correction by taking no corrective action and continuing the periodic transmission when HARQ feedback information does not exceed a predetermined amount or a predetermined threshold.

18. A method for a user equipment (UE), the method comprising:
performing a periodic transmission to one or more receiving UEs;
collecting negative acknowledgement (NACK) statistics for the periodic transmission according to one or more feedback-based collision detection parameters, wherein the one or more feedback-based collision detection parameters indicate that the NACK statistics are grouped into a plurality of datasets corresponding to different sets of transmissions for the periodic transmission; and
performing corrective action based on the collected NACK statistics and at least one of the one or more feedback-based collision detection parameters, wherein the plurality of datasets are sequentially evaluated to determine whether to perform the corrective action.

19. The method of claim 18, wherein one of the one or more feedback-based collision detection parameters comprises a number of total transmissions in the periodic transmission; and
wherein one of the one or more feedback-based collision detection parameters comprises a number of data collection transmissions for collecting the NACK statistics that is a subset of the number of total transmissions in the periodic transmission.

20. The method of claim 19, wherein a percentage of data collection transmissions having associated NACK feedback data is calculated, and the percentage is compared to a threshold relating to a percentage of the number of data collection transmissions that comprises NACK feedback data.

* * * * *